United States Patent
Suzuki

(10) Patent No.: US 9,457,279 B2
(45) Date of Patent: Oct. 4, 2016

(54) METHOD FOR PROVIDING BATTLE GAME, SERVER DEVICE, AND COMPUTER-READABLE RECORDING MEDIUM

(71) Applicant: GREE, INC., Tokyo (JP)

(72) Inventor: Koichi Suzuki, Tokyo (JP)

(73) Assignee: GREE, Inc., Tokyo (JP)

( * ) Notice: Subject to any disclaimer, the term of this patent is extended or adjusted under 35 U.S.C. 154(b) by 168 days.

(21) Appl. No.: 14/309,769

(22) Filed: Jun. 19, 2014

(65) Prior Publication Data

US 2014/0378209 A1 Dec. 25, 2014

(30) Foreign Application Priority Data

Jun. 21, 2013 (JP) ................... 2013-130232
Oct. 28, 2013 (JP) ................... 2013-223378

(51) Int. Cl.
| | |
|---|---|
| *A63F 13/12* | (2006.01) |
| *A63F 13/847* | (2014.01) |
| *A63F 13/795* | (2014.01) |
| *A63F 13/67* | (2014.01) |
| *A63F 13/822* | (2014.01) |

(52) U.S. Cl.
CPC ............ *A63F 13/847* (2014.09); *A63F 13/67* (2014.09); *A63F 13/795* (2014.09); *A63F 13/822* (2014.09); *A63F 2300/6027* (2013.01)

(58) Field of Classification Search
USPC ........................................... 463/23
See application file for complete search history.

(56) References Cited

U.S. PATENT DOCUMENTS

| | | | |
|---|---|---|---|
| 2011/0237335 A1* | 9/2011 | Holloway | A63F 13/12 463/42 |
| 2013/0053149 A1* | 2/2013 | Rouse | H04W 4/206 463/42 |
| 2016/0062521 A1* | 3/2016 | Rouse | A63F 13/795 463/31 |

FOREIGN PATENT DOCUMENTS

JP 2013-066524 A 4/2013

* cited by examiner

*Primary Examiner* — Pierre E Elisca
(74) *Attorney, Agent, or Firm* — Drinker Biddle & Reath LLP

(57) ABSTRACT

Low-proficiency players' motivation to participate in a battle game is enhanced. A server device calculates a difference $\Delta P1$ in a parameter between two characters belonging to the same group and successive in attack order, and performs presentation processing of increasing the effect of successive attacks by the two characters according to the difference $\Delta P1$ in the parameter. The parameter serves as an indicator for developing the battle game, and indicates, for example, the degree of proficiency in the battle game.

14 Claims, 6 Drawing Sheets

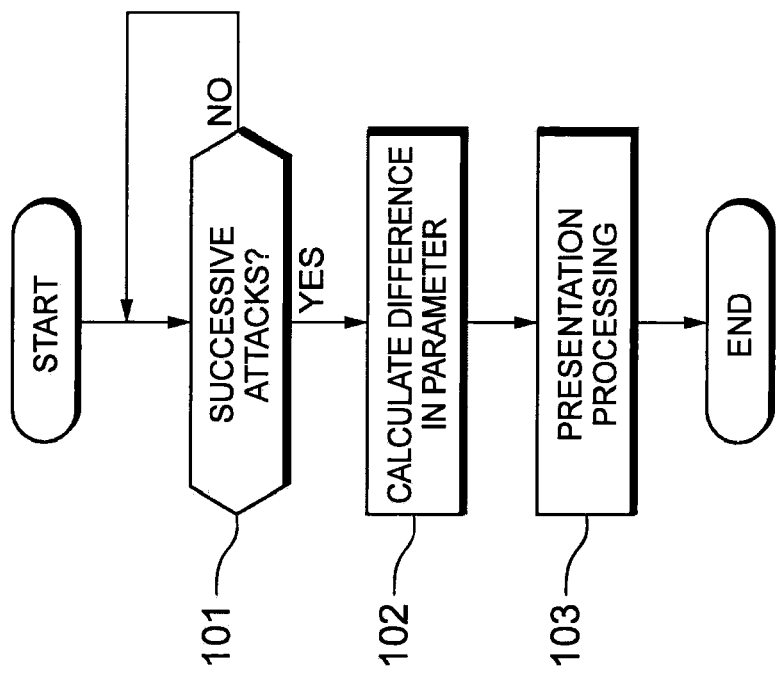

METHOD FOR PROVIDING BATTLE GAME, SERVER DEVICE, AND COMPUTER-READABLE RECORDING MEDIUM

BACKGROUND

Disclosed herein are a method for providing a battle game to each client device via a network, a server device, and a computer-readable recording medium.

As proposed in JP2013-066524 A, online game services provided from server devices to client devices via communication networks are popular, and many game titles are released from a plurality of platforms. There are a wide variety of types and categories of such games. Of these, social games that enable a plurality of players to participate in the same game are particularly gaining popularity. As this type of social game, for example, the following game service is commercially available: groups composed of characters operated by a plurality of players are formed, and players can not only participate in a battle event between groups but also communicate with each other. Such a game service is called MMORPG (Massively Multiplayer Online Role Playing Game), and built on predetermined human relationships among players though in a virtual world. As a technique of activating game operation by strengthening a sense of unity and solidarity among players, game presentation processing of increasing the effect of successive attacks when a plurality of characters belonging to the same group successively attack enemy characters is known as an example. This presentation processing is called "combo". Examples of known techniques regarding combos include: increasing the effect of successive attacks more when the number of attacks made within a predetermined time from the first attack is larger; and increasing the effect of successive attacks more when the number of successive attacks is larger on the condition that the time difference between attacks successively made by two characters is within a predetermined time.

SUMMARY

For a plurality of players to make successive attacks in cooperation with each other, the players need to be proficient in the battle game to a certain extent, and there is hardly any scene where inexperienced players can play active parts. Since it is more advantageous in terms of game development to form a group of skilled high-level players, inexperienced players are not sufficiently motivated to participate in the battle game.

Embodiments of the invention solve the problem stated above, and enhance low-proficiency players' motivation to participate in a battle game.

To solve the problem stated above, a method for providing a battle game disclosed herein is a method for providing a battle game between groups, which are composed of characters operated by players through client devices, to each client device via a network, wherein a server device storing, for each character, a parameter which serves as an indicator for developing the battle game between the groups: calculates a difference in the parameter between two characters belonging to the same group and successive in attack order; and performs presentation processing of increasing an effect of attack by the group according to the difference in the parameter. The parameter which serves as the indicator for developing the battle game differs between a high-proficiency player and a low-proficiency player. By performing the presentation processing of increasing the effect of successive attacks based on such a difference, it is possible to create more scenes where low-proficiency players can play active parts and thus activate game operation.

According to embodiments of the invention, low-proficiency players' motivation to participate in a battle game can be enhanced.

BRIEF DESCRIPTION OF THE DRAWINGS

FIG. 6 is a flowchart showing flow of "combo" presentation processing according to the embodiment.

DETAILED DESCRIPTION

The following describes an embodiment of the invention with reference to drawings.

Figure 1:
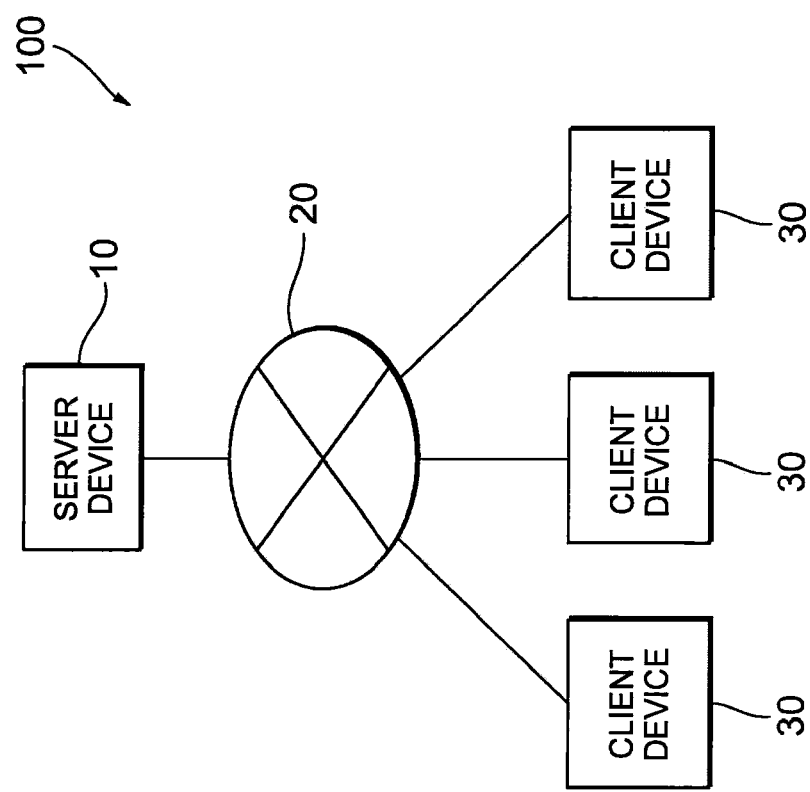
FIG. 1 is a diagram showing a network structure of a game system according to an embodiment.

FIG. 1 shows a network structure of a game system 100 according to this embodiment.

The game system 100 comprises a server device 10 for providing a battle game service to a plurality of client devices 30 via a network 20. The server device 10 is a network node having a function of providing the battle game service. As an example, the server device 10 is composed of a host computer with high operation processing capacity, though this is not a limit. As another example, the server device 10 may be composed of a general-purpose communication terminal device. Each client device 30 is a network node having a function of receiving the battle game service. As an example, the client device 30 is composed of a general-purpose communication terminal device. In this specification, the network node for providing the battle game service is referred to as "server device" regardless of its operation processing capacity, and the network node for receiving the battle game service is referred to as "client device". The online game service is provided when the server device 10 returns a response to a request from the client device 30.

The host computer constituting the server device 10 need not necessarily be one computer, and the server device 10 may be composed of a plurality of subcomputers distributed on the network 20. Examples of the general-purpose communication terminal device constituting the server device 10 or the client device 30 include a desktop PC, a notebook PC, a tablet PC, a laptop PC, and a mobile phone. For example, the mobile phone is a handheld mobile terminal such as PDC (Personal Digital Cellular), PCS (Personal Communication System), GSM® (Global System for Mobile communications), PHS (Personal Handy phone System), or PDA (Personal Digital Assistant), and is capable of data communication by a standard such as W-CDMA (Wideband Code Division Multiple Access), CDMA-2000 (Code Division Multiple Access-2000), IMT-2000 (International Mobile Telecommunication-2000), or WiBro (Wireless Broadband Internet). The network 20 is, for example, a communication network including a wired network (e.g. LAN (Local Area Network), WAN (Wide Area Network), VAN (Value Added Network), etc.) and a wireless network (e.g. mobile communication network, satellite communication network, Bluetooth, WiFi (Wireless Fidelity), HSDPA (High Speed Downlink Packet Access), etc.). A gateway server for conversion between communication protocols may be provided between the server device 10 and the client device 30.

Figure 2:
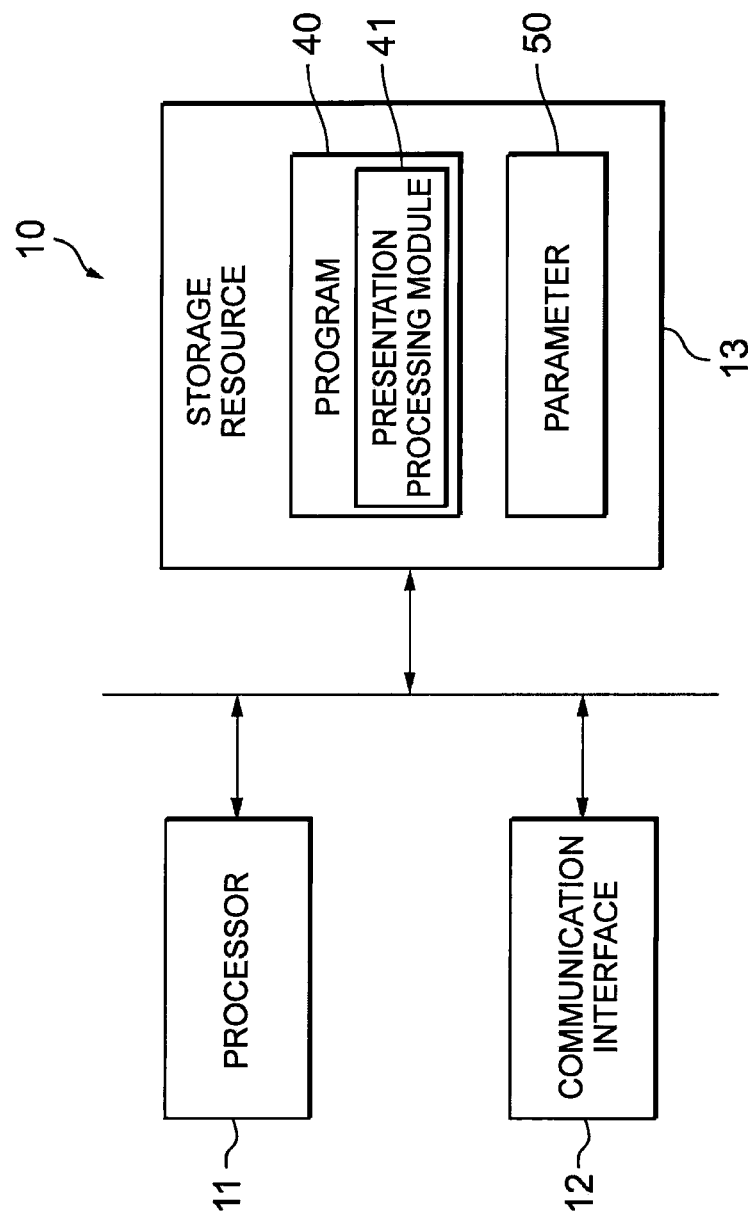
FIG. 2 is a block diagram showing a structure of a server device according to the embodiment.

FIG. 2 is a block diagram showing a structure of the server device 10 according to this embodiment.

The server device 10 comprises a processor 11, a communication interface 12, and a storage resource 13. The processor 11 comprises an arithmetic logic unit for processing arithmetic operations, logical operations, bit operations, and the like and various registers (program counter, data register, instruction register, general-purpose register, etc.). The processor 11 interprets and executes a computer program 40 stored in the storage resource 13, and returns responses to requests from the plurality of client devices 30. The computer program 40 is a program for performing game processing in response to requests from the plurality of client devices 30, and includes a plurality of software modules that are called in a main program and executed. These software modules are each a subprogram modularized to execute specific processing (game operation processing, image display processing, communication processing, etc.), and generated using procedures, subroutines, methods, functions, data structures, and so on. A module is an independently compilable unit. As one of such modularized subprograms, the computer program 40 includes a presentation processing module 41 for performing presentation processing of the battle game. The presentation processing module 41 will be described in detail later.

The storage resource 13 stores a parameter 50 for each character. The parameter 50 is a variable which serves as an indicator for developing the battle game, and more advantageous game development is expected when the parameter 50 is higher. As an example, the parameter 50 may be a variable indicating the degree of proficiency in the battle game. The degree of proficiency represents the player's skill or experience, and so is also referred to as "level". The level of the player increases as the player becomes more experienced in the battle game. As another example, the parameter 50 may be a variable indicating the "reward" acquired in the battle game. The reward is a value concept such that a higher reward has an effect of gaining more advantage over the opponent in development of the battle game. Though the reward can be regarded as resembling money in the real world, the reward need not necessarily be limited to a value resembling money in game processing in the virtual space. The reward may be, for instance, an item for increasing the character's offensive power, an item for recovering the character's health points or recovering from damage, or points added as a result of damaging an enemy character. The reward may have a value exchangeable between characters. As yet another example, the parameter 50 may be a variable indicating the time elapsed from the date on which the player participates in the battle game. The parameter 50 may be a variable that changes as the character's offensive ability or recovery ability changes.

The storage resource 13 is, for example, a logical device provided by a storage area in a physical device (e.g. a computer-readable recording medium such as a disk drive or a semiconductor memory). A plurality of physical devices may be mapped to one logical device, or one physical device may be mapped to a plurality of logical devices. Data and logs indicating the access history, play status, game progress state, and the like of each client device 30 are stored in the storage resource 13. The communication interface 12 is a hardware module for connecting to the client device 30 via the network 20, and is, for example, an ISDN modem, an ADSL modem, or a cable modem.

Figure 3:
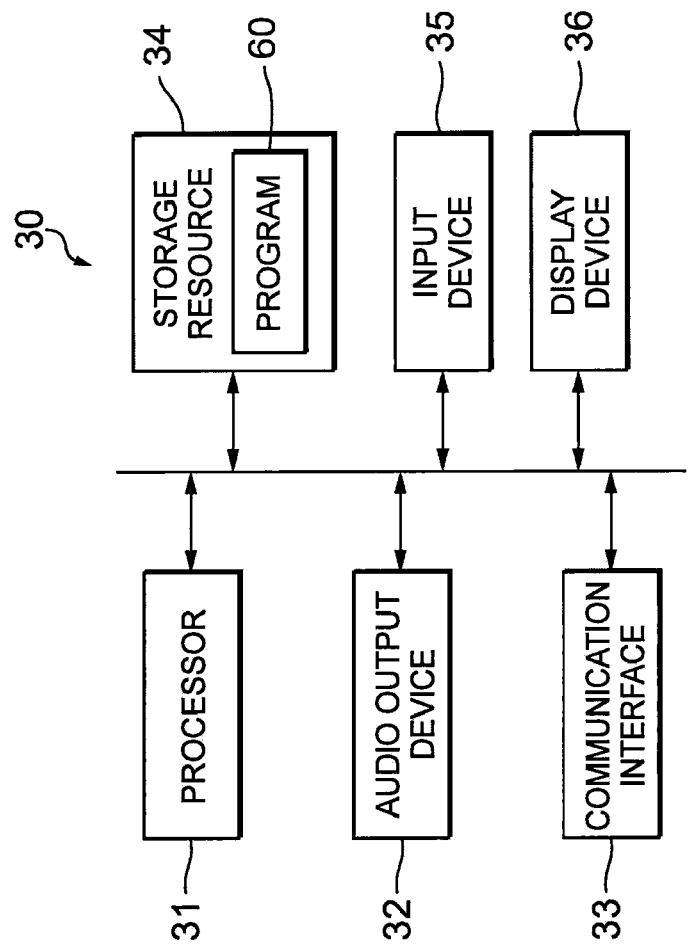
FIG. 3 is a block diagram showing a structure of a client device according to the embodiment.

FIG. 3 is a block diagram showing a structure of the client device 30 according to this embodiment.

The client device 30 comprises a processor 31, an audio output device 32, a communication interface 33, a storage resource 34, an input device 35, and a display device 36. The processor 31 includes an arithmetic logic unit and various registers (program counter, data register, instruction register, general-purpose register, etc.). The processor 31 interprets and executes a computer program 60 stored in the storage resource 34, and transmits a request to the server device 10 according to operation information input via the input device 35 and receives a response from the server device 10. The computer program 60 is an application program for connecting to the server device 10 and receiving the battle game service. The application program can be distributed from the server device 10 via the network 20.

The storage resource 34 is a logical device provided by a storage area in a physical device (e.g. a computer-readable recording medium such as a disk drive or a semiconductor memory), and stores an operating system program, driver programs, various data, and the like used for processing in the client device 10. The driver programs are, for example, an input device driver program for controlling the input device 35 and an output device driver program for controlling each of the audio output device 32 and the display device 36. The various data are, for example, image data of each object or background in game screens. The audio output device 32 is, for example, a sound player capable of reproducing sound data such as game sound effects. The communication interface 33 provides an interface for connecting to the server device 10, and includes a wireless communication interface or a wired communication interface. The input device 35 provides an interface for receiving input operations from the player, and is, for example, a touch panel, a keyboard, a mouse, or the like. The display device 36 provides an image display interface for game screens and the like to the player, and is, for example, an organic EL display, a liquid crystal display, a CRT display, or the like.

When the player operates the input device 35 to input authentication information (e.g. an ID and a password) and log into the game service of the server device 10, a My Page screen associated with the authentication information of the player is displayed on the display device 36. A menu screen about a group to which each individual player belongs is displayed in the My Page screen. The "group" is a virtual collection composed of characters operated by players through client devices 30. The group may be created or formed on a game title basis, or be common to a plurality of game titles. The group formed for such a purpose is also called "guild", "party", "team", "community", or the like in the field of social games. The "character" is a virtual object acting in the virtual space on behalf of the player according to the player's instructions.

A character operated by a player who has previously participated in the game service provided by the server device 10 basically belongs to some group, and the corresponding history information is stored in the storage resource 13 in the server device 10 in association with the authentication information of the player. Based on this history information, an edit menu screen about the group is displayed on the display device 36. On the other hand, a character operated by a player who participates in the game service provided by the server device 10 for the first time basically does not belong to any specific group. Accordingly, a menu screen for joining a group (e.g. a screen for searching for a group or forming a new group) is displayed on the display device 36. When the player, having decided or selected the group to which he or she belongs, selects to participate in the game service, a screen of a game event held at the time is displayed on the display device 36.

Figure 4:
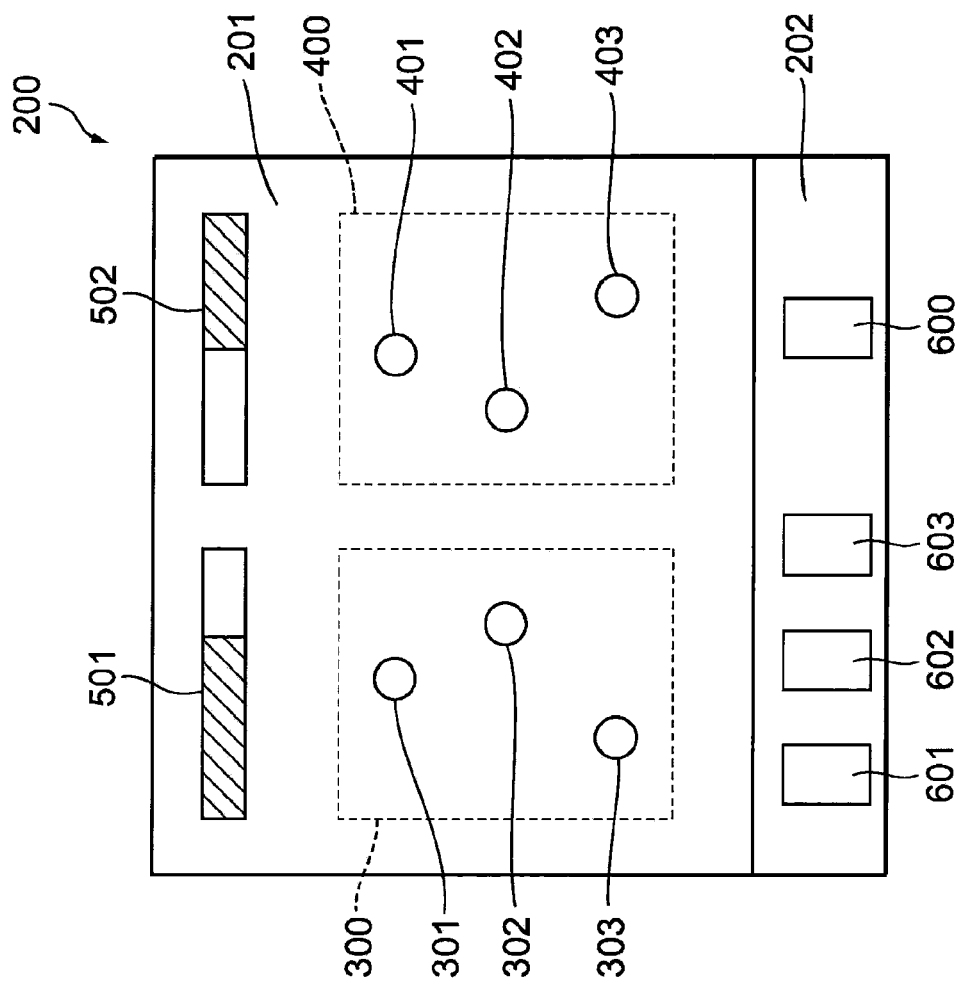
FIG. 4 is an explanatory diagram showing an example of a game screen according to the embodiment.

FIG. 4 is an explanatory diagram showing an example of a game screen 200 according to this embodiment.

The game screen 200 comprises an event field 201 and a palette 202. The event field 201 is a virtual field in which a battle game between groups 300 and 400 is developed. Characters 301, 302, and 303 belonging to the group 300 and characters 401, 402, and 403 belonging to the other group 400 are displayed in the event field 201. A battle between groups is called "guild battle", or "GvG" based on the first letter (G) of the word "guild". The characters belonging to the same group attack the opponent characters belonging to the opponent group while communicating with each other. The palette 202 is a virtual area for deciding, by lottery, "skills" available when each character attacks its opponent character. A deck 600 which is a virtual set of cards and a plurality of cards 601, 602, and 603 selected from the deck 600 are displayed in the palette 202. A representation (illustration or text) of a type of skill and a specific item related to the skill are drawn in each card. In addition, an attack value (points of a skill or exercised attack) and a defense value are set in each card. Each player turns over the plurality of cards 601, 602, and 603 from the deck 600, and attacks the opponent character according to the combination of skills, attack values, specific items, defense values, and the like shown in the cards 601, 602, and 603. Damage inflicted on the opponent character and damage inflicted on the character of the player are then calculated. A gauge 501 displays the number of attacks successively made by the characters 301, 302, and 303 belonging to the group 300 on the opponent characters 401, 402, and 403. Likewise, a gauge 502 displays the number of attacks successively made by the characters 401, 402, and 403 belonging to the group 400 on the opponent characters 301, 302, and 303. The number of successive attacks is referred to as "combo count", and the gauges 501 and 502 displaying the combo counts are each referred to as "combo gauge".

Figure 5:
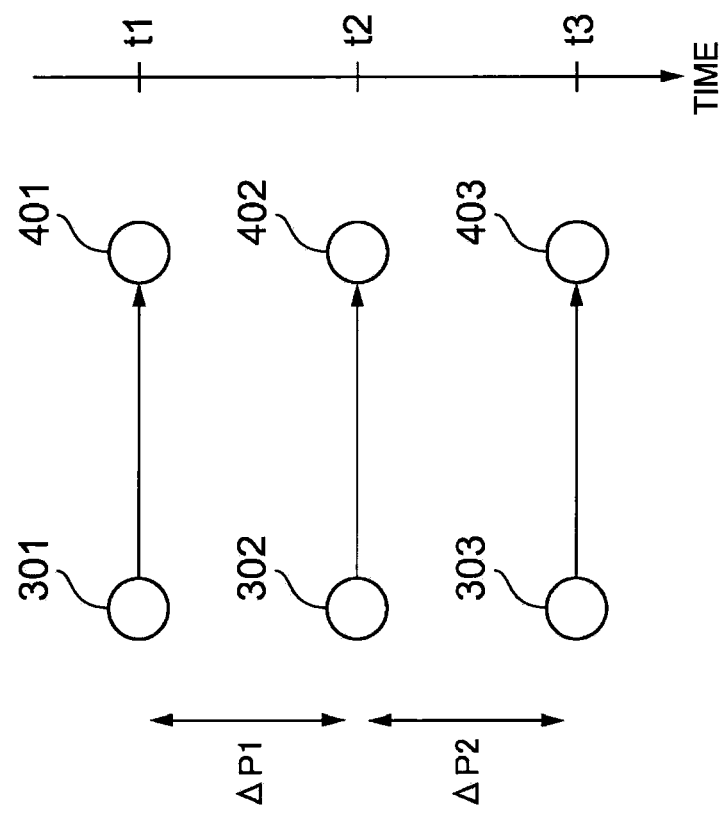
FIG. 5 is an explanatory diagram of a "combo" presentation effect according to the embodiment.

FIG. 5 is an explanatory diagram of a "combo" presentation effect according to this embodiment.

The presentation processing module 41 performs presentation processing of increasing, according to the difference in the parameter 50 between two characters belonging to the same group and successive in the attack order, the effect of attack by the group. For example, the character 301 attacks the character 401 at time t1 and, following this, the character 302 attacks the character 402 at time t2. Here, the effect of attack by the group 300 (e.g. the attack by the character 302 on the character 402) is increased more when the difference ΔP1 in the parameter 50 between the two characters 301 and 302 is larger. Following this, the character 303 attacks the character 403 at time t3. Here, the effect of attack by the group 300 (e.g. the attack by the character 303 on the character 403) is increased more when the difference ΔP2 in the parameter 50 between the two characters 302 and 303 is larger.

If the parameter 50 is set to indicate the degree of proficiency in the battle game, for example, the effect of successive attacks can be increased by successively making an attack by a character operated by a player with a high degree of proficiency in the battle game and an attack by a character operated by a player with a low degree of proficiency in the battle game. This creates more scenes where players with low proficiency in the battle game can play active parts, making the social game more active. In particular, inexperienced players are effectively motivated to participate in the game. Moreover, since the order of characters to make successive attacks is important in such presentation processing, the communication among the players belonging to the same group is encouraged, and the solidarity in the group is strengthened. If the parameter 50 is set to indicate the reward, for example, the effect of successive attacks can be increased by successively making an attack by a character operated by a player with a high acquired reward and an attack by a character operated by a player with a low acquired reward. This creates more scenes where players with low acquired rewards can play active parts. If the parameter 50 is set to indicate the time elapsed from the date of participation in the battle game, for example, the effect of successive attacks can be increased by successively making an attack by a character operated by a veteran player with a long time elapsed from the date of participation in the battle game and an attack by a character operated by a beginner player with a short time elapsed from the date of participation in the battle game. This creates more scenes where beginner players can play active parts.

The effect of successive attacks by the plurality of characters may be controlled according to not only the difference in the parameter 50 between the plurality of characters but also the number of successive attacks. For instance, the effect of successive attacks may be increased more when the number of attacks made by any characters in the group 300 within a predetermined time from time t1 at which the first attack starts is larger. Alternatively, the effect of successive attacks may be increased more when the number of successive attacks is larger on the condition that the time difference ("t2−t1" or "t3−t2") between attacks successively made by two characters is within a predetermined time.

FIG. 6 is a flowchart showing flow of "combo" presentation processing according to this embodiment.

When the presentation processing module 41 detects successive attacks by two characters belonging to the same group (step 101: YES), the presentation processing module 41 calculates the difference in the parameter 50 between the two characters successive in the attack order (step 102), and performs presentation processing of increasing the effect of attack by the group according to the difference in the parameter 50 (step 103). The presentation processing module 41 is a subprogram written using a command set for causing the server device 10 to execute the process of steps 101 to 103.

Though the above-mentioned "combo" presentation processing is realized by the presentation processing module 41 and the processor 11 in cooperation with each other, the same presentation processing may be performed by a dedicated hardware resource (e.g. an application specific integrated circuit (ASIC)) or firmware. Moreover, the computer program 40 may be written in, for example, an object-oriented language. In the object-oriented language, the characters 301 to 303 and 401 to 403 are treated as objects, the parameter 50 is defined as an "attribute value" of each of the characters 301 to 303 and 401 to 403, and the behavior (e.g. attack) of each of the characters 301 to 303 and 401 to 403 is defined as a "method" of the corresponding character, to enable battle game processing. Image display can be controlled by treating not only the characters 301 to 303 and 401 to 403 but also the gauges 501 and 502, the cards 601, 602, and 603, and the like displayed in the game screen 200 as objects and defining their "attribute values" and "methods". The computer program 40 is not limited to the object-oriented language, and may be written in, for example, a procedure-oriented language. The computer program 40 may be encoded in a predetermined signal format and transmitted between nodes via a transmission medium (wired communication network) or a transmission wave (radio wave).

The embodiment described above is merely illustrative of the invention, and the invention should not be limited to the embodiment. Various modifications are possible, without departing from the scope of the invention. For example, a person skilled in the art can replace one or more resources (hardware resources or software resources) described in the embodiment with their equivalents, and such replacement is also included within the scope of the invention.

According to embodiments of the invention, more scenes where players with low proficiency in a battle game can play active parts are created, thus enhancing such players' motivation to participate in the game. In particular, the invention can be widely used for activities such as design, manufacture, and sales of all online games distributed, provided, and implemented in client server game systems.

DESCRIPTION OF REFERENCE NUMERALS

10: server device
11: processor
12: communication interface
13: storage resource
20: network
30: client device
31: processor
32: audio output device
33: communication interface
34: storage resource
35: input device
36: display device
40: computer program
41: presentation processing module
50: parameter
60: computer program
100: game system

What is claimed is:

1. A method for providing a battle game to each of a plurality of client devices via a network, comprising:
    storing, by a server device, for each of a plurality of characters, a parameter which serves as an indicator for developing the battle game;
    displaying, by a processor of said client device of a player who operates a character not belonging to any specific group, on a display device of the client device, a screen prompting said player to decide or select a group to which the character belongs; and
    performing, by a processor of the server device, presentation processing of increasing, according to a difference in the parameter between two characters belonging to the same group and successive in attack order, an effect of attack by the group.

2. The method according to claim 1, wherein displaying, by the processor of the client device, comprises displaying a screen for searching for a group in the battle game.

3. The method according to claim 1, wherein displaying, by the processor of the client device, comprises displaying a screen for forming a new group by the player.

4. A method for providing a battle game to each of a plurality of client devices via a network, comprising:
    storing, by a server device, for each of a plurality of characters, a parameter which serves as an indicator for developing the battle game;
    displaying, by a processor of said client device of a player who operates a character belonging to a specific group, on a display device of said client device, a screen showing information about the specific group; and
    performing, by a processor of the server device, presentation processing of increasing, according to a difference in the parameter between two characters belonging to the same group and successive in attack order, an effect of attack by the group.

5. The method according to claim 1, wherein the presentation processing of increasing the effect of attack by the group more when the number of successive attacks by a plurality of characters belonging to the same group is larger is performed.

6. The method according to claim 1, wherein the parameter indicates any of a degree of proficiency in the battle game, a reward acquired in the battle game, and a time elapsed from a date of participation in the battle game.

7. A non-transitory computer-readable recording medium having recorded therein program code instructions that, when executed by a computer, provide:
    causing a client device of a player who operates a character not belonging to any specific group, to display a screen prompting to decide or select a group to which the character belongs;
    storing, for each character, a parameter which serves as an indicator for developing a battle game; and
    performing presentation processing of increasing, according to a difference in the parameter between two characters belonging to the same group and successive in attack order, an effect of attack by the group.

8. A non-transitory computer-readable recording medium having recorded therein program code instructions that, when executed by a computer, provide:
    causing a client device of a player who operates a character belonging to a specific group, to display a screen showing information about the specific group;
    storing, for each character, a parameter which serves as an indicator for developing a battle game; and
    performing presentation processing of increasing, according to a difference in the parameter between two characters belonging to the same group and successive in attack order, an effect of attack by the group.

9. A method executed in a client device operated by a player, the client device being connectable to a server device via a communication line, the method comprising:
    receiving, by a processor of the client device, information necessary for a battle game from the server device;
    displaying, by the processor, on a display device of the client device of the player who operates a character not belonging to any specific group, a screen prompting the player to decide or select a group to which the character belongs; and
    displaying, by the processor, on the display device, presentation processing of increasing, according to a difference in a parameter between two characters belonging to the same group and successive in attack order, an effect of attack by the group.

10. A method executed in a client device operated by a player, the client device being connectable to a server device via a communication line, the method comprising:
    receiving, by a processor of the client device, information necessary for a battle game from the server device;

displaying, by the processor, on a display device of the client device of the player who operates a character belonging to a specific group, a screen showing information about the specific group; and displaying, by the processor, on the display device, presentation processing of increasing, according to a difference in a parameter between two characters belonging to the same group and successive in attack order, an effect of attack by the group.

11. A server device comprising:

a processor operative to cause a client device of a player who operates a character not belonging to any specific group, to display a screen prompting to decide or select a group to which the character belongs;

a storage resource operative under command of the processor to store, for each character, a parameter which serves as an indicator for developing a battle game; and the processor further being operative to perform presentation processing of increasing, according to a difference in the parameter between two characters belonging to the same group and successive in attack order, an effect of attack by the group.

12. A server device comprising:

a processor operative to cause a client device of a player who operates a character belonging to a specific group, to display a screen showing information about the specific group; and a storage resource operative under command of the processor to store, for each character, a parameter which serves as an indicator for developing a battle game;

the processor further being operative to perform presentation processing of increasing, according to a difference in the parameter between two characters belonging to the same group and successive in attack order, an effect of attack by the group.

13. A system comprising: a client device operated by a player; and a server device for providing a battle game to each client device via a network, the server device comprising:

a processor operative to cause the client device of the player who operates a character not belonging to any specific group, to display a screen prompting to decide or select a group to which the character belongs; and a computer-readable recording medium operative under command of the processor to store, for each character, a parameter which serves as an indicator for developing the battle game;

the processor further being operative to perform presentation processing of increasing, according to a difference in the parameter between two characters belonging to the same group and successive in attack order, an effect of attack by the group.

14. A system comprising: a client device operated by a player; and a server device for providing a battle game to each client device via a network, the server device comprising:

a processor operative to cause the client device of the player who operates a character belonging to a specific group, to display a screen showing information about the specific group; and a computer-readable recording medium operative under command of the processor to store, for each character, a parameter which serves as an indicator for developing the battle game;

the processor further being operative to perform presentation processing of increasing, according to a difference in the parameter between two characters belonging to the same group and successive in attack order, an effect of attack by the group.

* * * * *